United States Patent
Mori (10) Patent No.: US 10,473,005 B2
(45) Date of Patent: Nov. 12, 2019

(54) LUBRICATION STRUCTURE FOR INTERNAL COMBUSTION ENGINE

(71) Applicant: SUZUKI MOTOR CORPORATION, Shizuoka-Ken (JP)

(72) Inventor: Masaki Mori, Shizuoka-Ken (JP)

(73) Assignee: SUZUKI MOTOR CORPORATION (JP)

( * ) Notice: Subject to any disclaimer, the term of this patent is extended or adjusted under 35 U.S.C. 154(b) by 130 days.

(21) Appl. No.: 15/858,251

(22) Filed: Dec. 29, 2017

(65) Prior Publication Data
US 2018/0223706 A1 Aug. 9, 2018

(30) Foreign Application Priority Data
Feb. 7, 2017 (JP) ................. 2017-020345

(51) Int. Cl.
| | |
|---|---|
| F01M 1/00 | (2006.01) |
| F01M 1/06 | (2006.01) |
| F01M 1/02 | (2006.01) |
| F16H 57/04 | (2010.01) |
| F01M 9/10 | (2006.01) |
| F01M 1/16 | (2006.01) |

(52) U.S. Cl.
CPC ............ *F01M 1/06* (2013.01); *F01M 1/02* (2013.01); *F01M 1/16* (2013.01); *F01M 9/108* (2013.01); *F16H 57/0435* (2013.01)

(58) Field of Classification Search
CPC .................... F16H 57/0435; F01M 9/108
See application file for complete search history.

(56) References Cited

U.S. PATENT DOCUMENTS

| | | | | |
|---|---|---|---|---|
| 2004/0149242 | A1* | 8/2004 | Hori ............. | F01M 13/00 123/41.86 |
| 2005/0193974 | A1* | 9/2005 | Terada ........... | F01M 1/12 123/196 R |
| 2009/0056669 | A1* | 3/2009 | Maehara ......... | F01L 1/143 123/198 F |
| 2012/0012079 | A1* | 1/2012 | Mori ............. | F02F 7/0007 123/193.2 |

(Continued)

FOREIGN PATENT DOCUMENTS

JP 2010196636 A 9/2010

*Primary Examiner* — Hieu T Vo
*Assistant Examiner* — Sherman D Manley
(74) *Attorney, Agent, or Firm* — Barnes & Thornburg LLP (57) ABSTRACT

A lubrication structure for an internal combustion engine includes a crankcase, an oil pump, and a relief valve. The crankcase is configured by connecting an upper crankcase on a mating surface of a lower crankcase, and has an oil pan. The oil pump and the relief valve are installed in the lower crankcase. The oil pump sucks oil in the oil pan through a suction passage, and discharges the oil into a discharge passage. The relief valve performs a valve-opening operation according to pressure of oil in the discharge passage to return surplus oil in the discharge passage to the suction passage through a surplus passage. These passages are formed in the lower crankcase. A relief valve housing section housing the relief valve, and the surplus passage allowing the relief valve housing section and the suction passage to communicate with each other, are provided to communicate with the mating surface.

8 Claims, 11 Drawing Sheets

(56) References Cited

U.S. PATENT DOCUMENTS

| | | | |
|---|---|---|---|
| 2013/0255617 A1* | 10/2013 | Kawamata | F04B 7/00 |
| | | | 123/188.9 |
| 2013/0255643 A1* | 10/2013 | Ono | F01M 1/16 |
| | | | 123/496 |
| 2014/0076268 A1* | 3/2014 | Furuya | F02F 1/002 |
| | | | 123/197.4 |
| 2016/0230622 A1* | 8/2016 | Kurata | F01M 1/08 |
| 2017/0067378 A1* | 3/2017 | Ishihara | F01M 1/16 |

* cited by examiner

LUBRICATION STRUCTURE FOR INTERNAL COMBUSTION ENGINE

CROSS-REFERENCE TO RELATED APPLICATIONS

This application claims the benefit of priority of Japanese Patent Application No. 2017-020345, filed on Feb. 7, 2017, the entire contents of which are incorporated herein by reference.

BACKGROUND OF THE INVENTION

Field of the Invention

The present invention relates to a lubrication structure for an internal combustion engine of an inner relief structure that returns surplus oil, of oil that is discharged to a discharge passage from an oil pump, to a suction passage through a relief valve and a surplus passage.

Description of the Related Art

Patent Document 1 (Japanese Patent Laid-Open No. 2010-196636) discloses an internal combustion engine in which an oil pump is provided in a crankcase of the internal combustion engine, and an oil pressure control device that controls pressure of oil discharged from the oil pump is placed, in which an oil supply passage that guides the oil discharged from the oil pump is connected to the oil pressure control device from below, one end of a surplus oil passage that guides surplus oil discharged from the oil pressure control device is connected to the oil pressure control device from below, a relief valve is placed in the surplus oil passage, and the other end of the surplus oil passage is connected to a suction side of the oil pump.

The relief valve opens in response to the pressure of the surplus oil in the surplus oil passage reaching a predetermined value or more, and the surplus oil in the surplus oil passage, which is discharged from the oil pressure control device, is returned to the suction side of the oil pump.

However, in the internal combustion engine described in Patent Document 1 mentioned above, in order to ensure a space in which the relief valve is to be disposed, in the vicinity of the oil pump, increase in the size of the crankcase cannot be avoided, and the weight of the internal combustion engine increases. Further, in the surplus oil passage, the oil passage tends be long, and the number of curving spots in the oil passage increases, and oil flow resistance increases. Consequently, pump efficiency of the oil pump is reduced. Furthermore, the surplus oil passage and the oil supply passage need blank caps for closing unnecessary openings in the oil passages. Consequently, the number of components and the number of assembly steps increase, the weight of the crankcase increases.

SUMMARY OF THE INVENTION

In the light of the aforementioned circumstances, an object of the present invention is to provide a lubrication structure for an internal combustion engine that can shorten a surplus passage that returns surplus oil, of oil that is discharged to a discharge passage from an oil pump, to a suction passage through a relief valve and therefore can enhance pump efficiency, and can further abolish blank caps around the relief valve and therefore can reduce a number of components.

The above and other objects can be achieved according to the present invention by providing, in one aspect, a lubrication structure for an internal combustion engine includes a crankcase, an oil pump, and a relief valve. The crankcase is configured by connecting an upper crankcase on a mating surface of a lower crankcase from above, and has an oil pan storing oil and disposed in a lower part of the lower crankcase. The crankcase comprises a main part of the internal combustion engine. The oil pump is installed in the lower crankcase, sucks oil in the oil pan through a suction passage formed in the lower crankcase, and discharges the oil into a discharge passage formed in the lower crankcase to pressure-feed the oil. The relief valve is installed in the lower crankcase, and performs a valve opening operation in accordance with pressure of oil in the discharge passage to return surplus oil in the discharge passage to the suction passage through a surplus passage formed in the lower crankcase. A relief valve housing section that houses the relief valve, and the surplus passage that allows the relief valve housing section and the suction passage to communicate with each other are provided to communicate with the mating surface of the lower crankcase directly or indirectly.

According to the present invention, the relief valve housing section and the surplus passage can be closely disposed in the vicinity of the oil pump, so that the surplus passage can be specially shortened, as a result of which, the pump efficiency of the oil pump can be enhanced. Further, the relief valve housing section and the surplus passage which are provided to communicate with the mating surface of the lower crankcase directly or indirectly are closed with the upper crankcase as a lid. Consequently, blank caps are not required by the relief valve housing section around the relief valve and the surplus passage, and the number of components can be reduced.

The nature and further characteristic features of the present invention will be described hereinafter in the following descriptions made with reference to the accompanying drawings, and the other advantages effects and functions of the present invention will be also made clear hereinafter.

DETAILED DESCRIPTION

Hereinafter, an embodiment for carrying out the present invention will be described based on the drawings.

Figure 1:
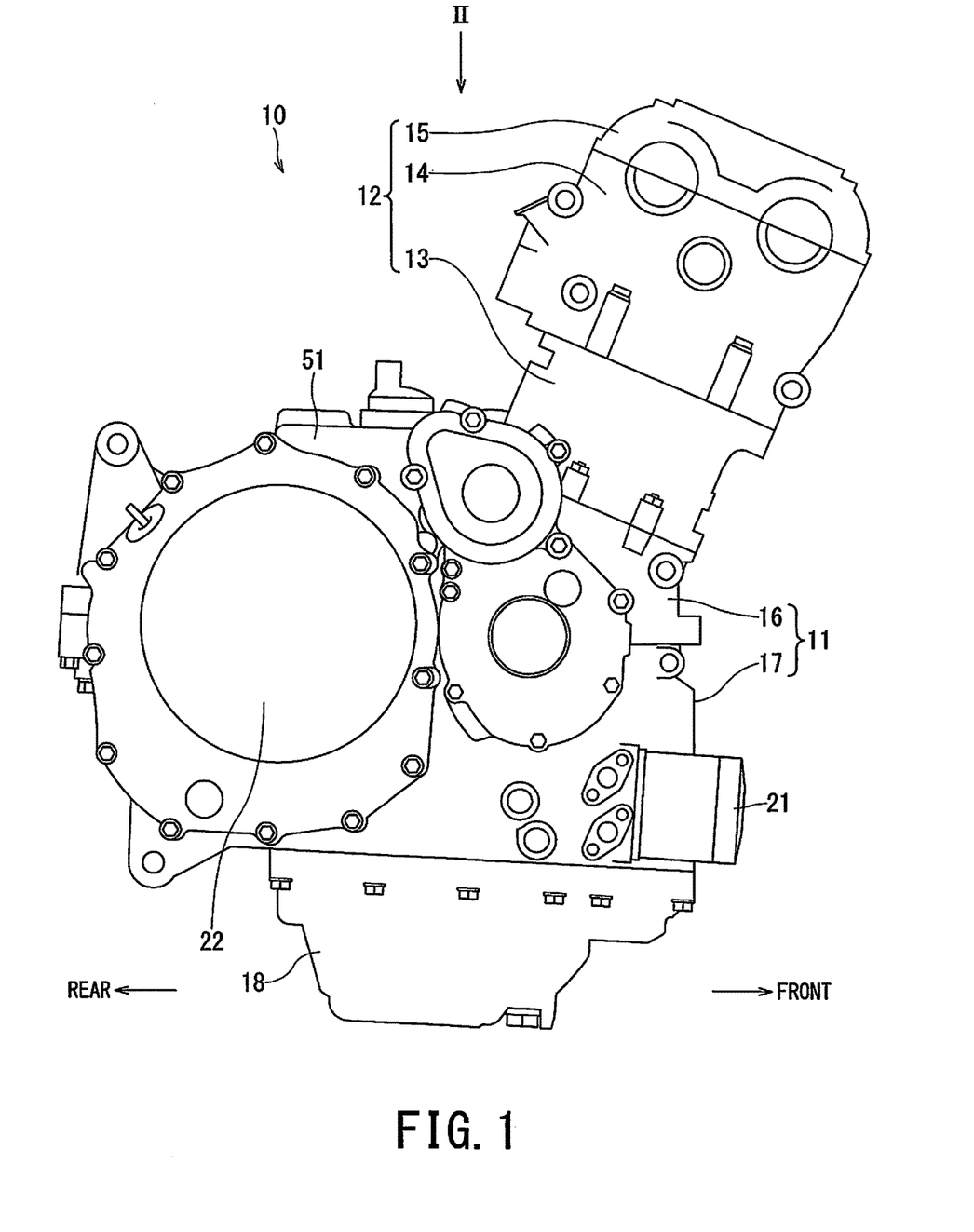
FIG. 1 is a right side view illustrating an engine to which an embodiment of a lubrication structure for an internal combustion engine according to the present invention is applied.
Figure 2:
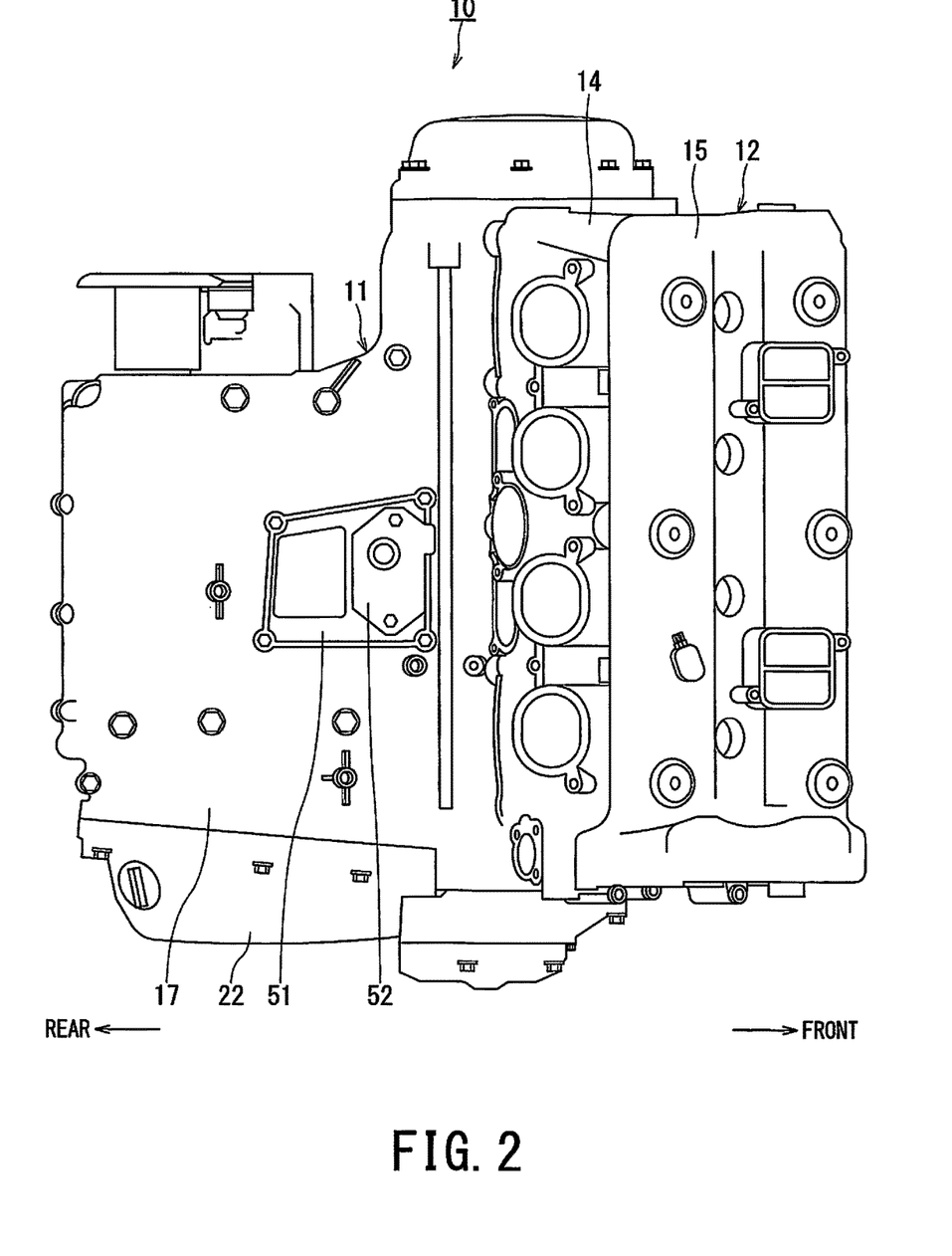
FIG. 2 is a view seen from arrow II in FIG. 1.

FIG. 1 is a right side view illustrating an engine to which an embodiment of a lubrication structure for an internal combustion engine according to the present invention is applied. FIG. 2 is a view seen from arrow II in FIG. 1. An engine 10 as the internal combustion engine illustrated in FIGS. 1 and 2 is loaded on a motorcycle, for example, and a cylinder assembly 12 is connected to a crankcase 11 by being tilted forward. The cylinder assembly 12 is configured by a cylinder block 13, a cylinder head 14 and a head cover 15 being sequentially connected from below. The aforementioned crankcase 11 and cylinder assembly 12 configure a main part of the engine 10.

Figure 3:
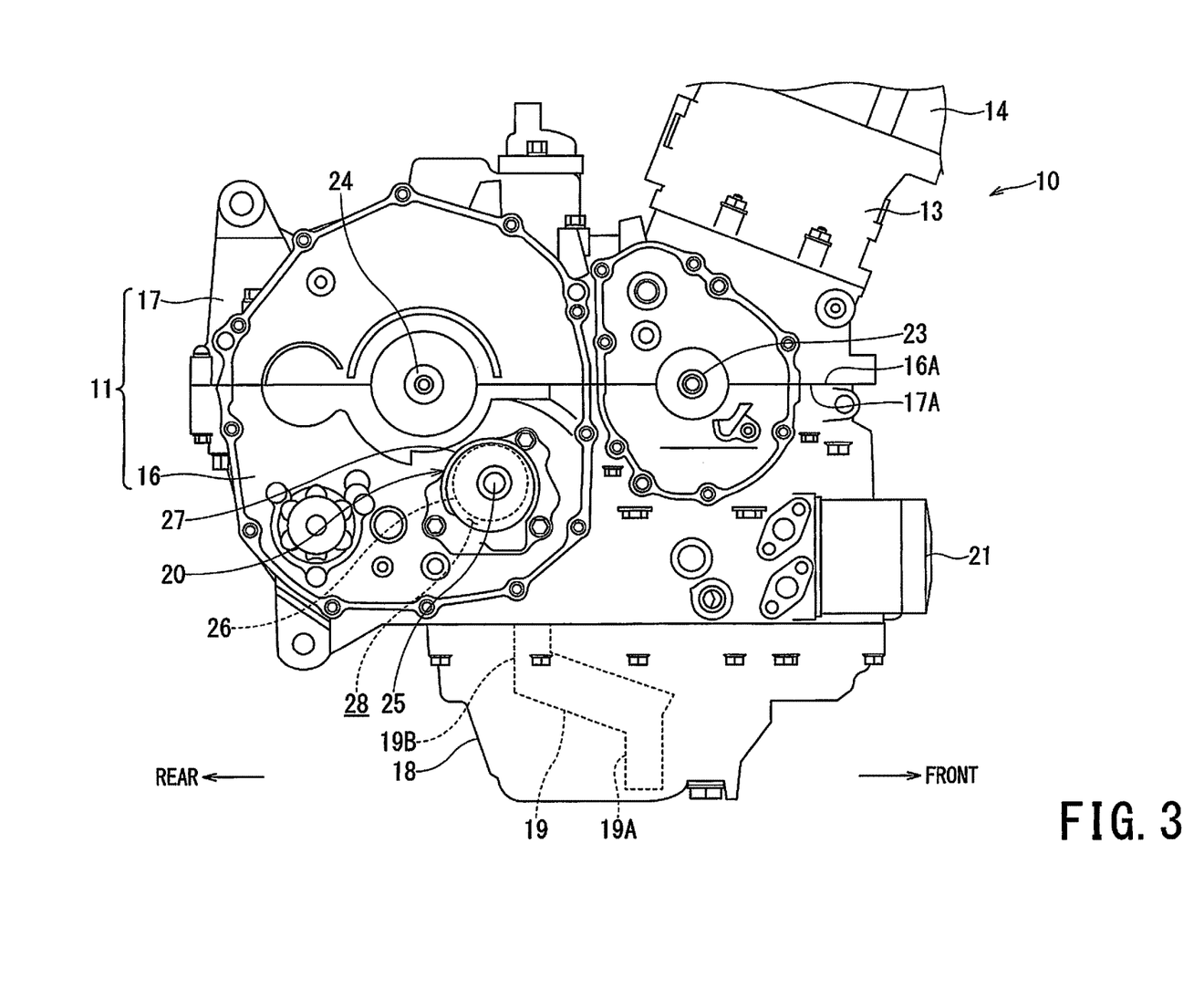
FIG. 3 is a right side view illustrating the engine by removing a clutch cover and the like in the engine in FIG. 1.

As is also illustrated in FIG. 3, the crankcase 11 is constructed by bringing a mating surface 17A of an upper crankcase 17 into contact with a mating surface 16A of a lower crankcase 16 from above, and connecting the upper crankcase 17 to the lower crankcase 16 in this state. An oil pan 18 that stores oil for engine lubrication is disposed at a lower part of the lower crankcase 16. An oil strainer 19 is placed in the oil pan 18.

An oil filter 21 is installed in a front part of the lower crankcase 16. An oil pump 20 is installed in a right side wall of the lower crankcase 16, in a state where the oil pump 20 is covered with a clutch cover 22. In the oil pump 20, a pump shaft 25 is driven by a rotational force of a countershaft 24 that is rotationally driven by a rotational force of a crankshaft 23 via a clutch mechanism not illustrated, and a pump rotor 26 rotating integrally with the pump shaft 25 rotates. The pump rotor 26 is housed in a pump body 27, and forms a pump chamber 28 in a space from the pump body 27.

Figure 4:
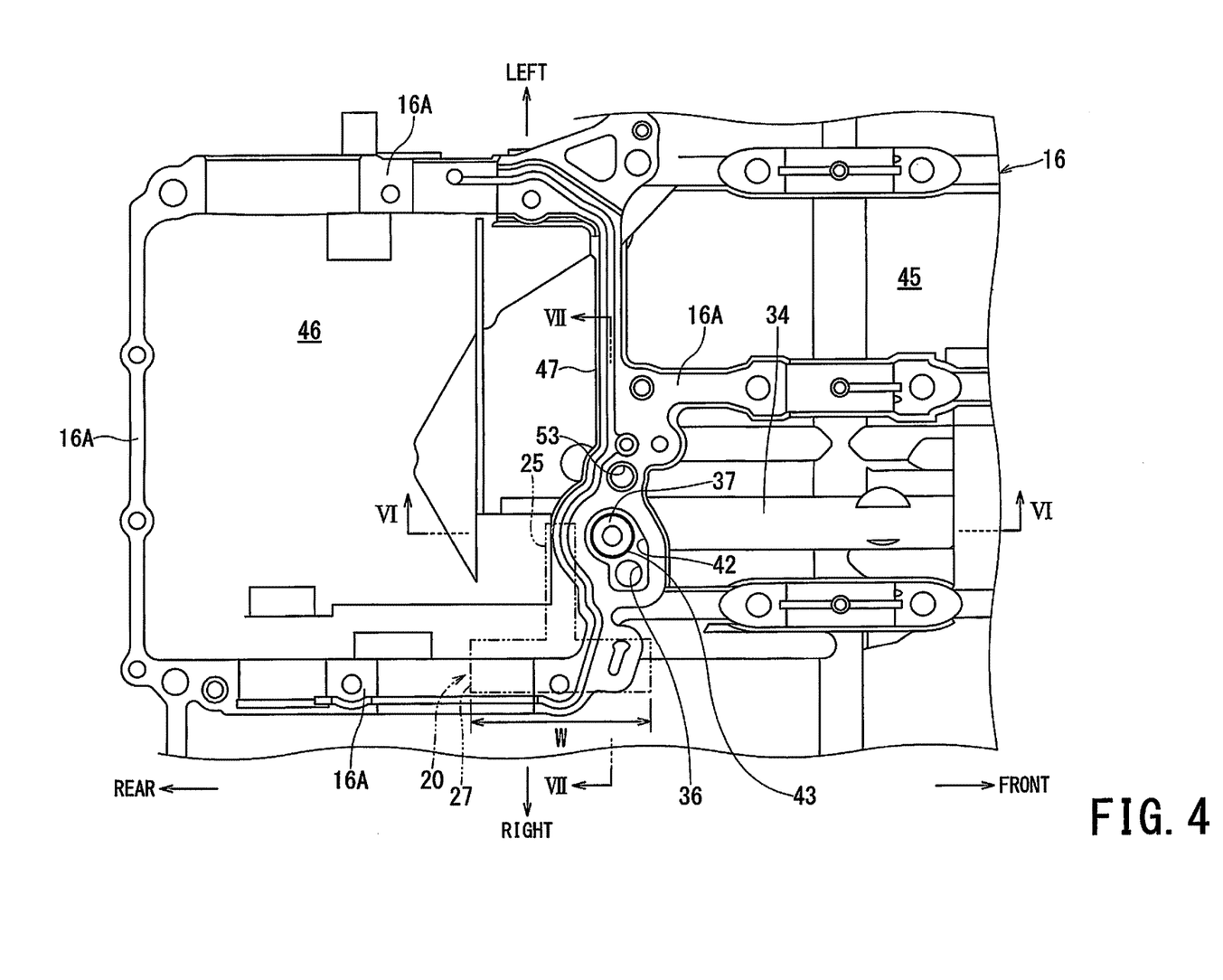
FIG. 4 is a partial plan view illustrating a part of a lower crankcase in FIG. 3.
Figure 5:
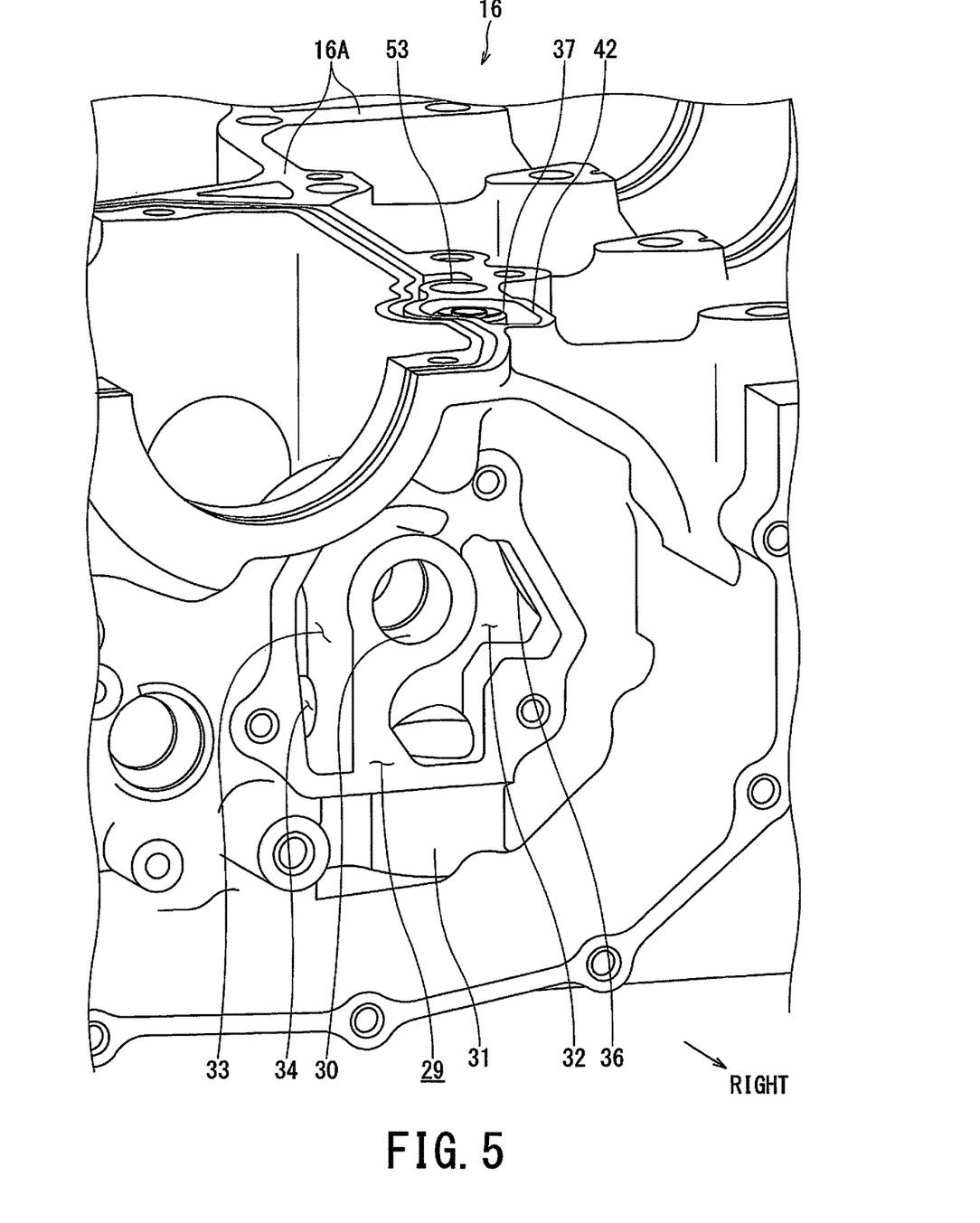
FIG. 5 is a perspective view illustrating the lower crankcase in FIG. 4 visually observed from upper right side.

As is illustrated in FIGS. 4 and 5, on a right side wall of the lower crankcase 16, a pump mounting surface 29 for mounting a pump body 27 of the oil pump 20 is formed, and further, a insertion hole 30 for allowing a pump shaft 25 of the oil pump 20 to be inserted through is provided. In the lower crankcase 16, a second suction passage 32 is formed in one side region in a periphery of the insertion hole 30 inside the pump mounting surface 29, and a first discharge passage 33 is formed in the other side region, in such a manner that the second suction passage 32 and the first discharge passage 33 are respectively communicable with the pump chamber 28 of the oil pump 20.

Figure 6:
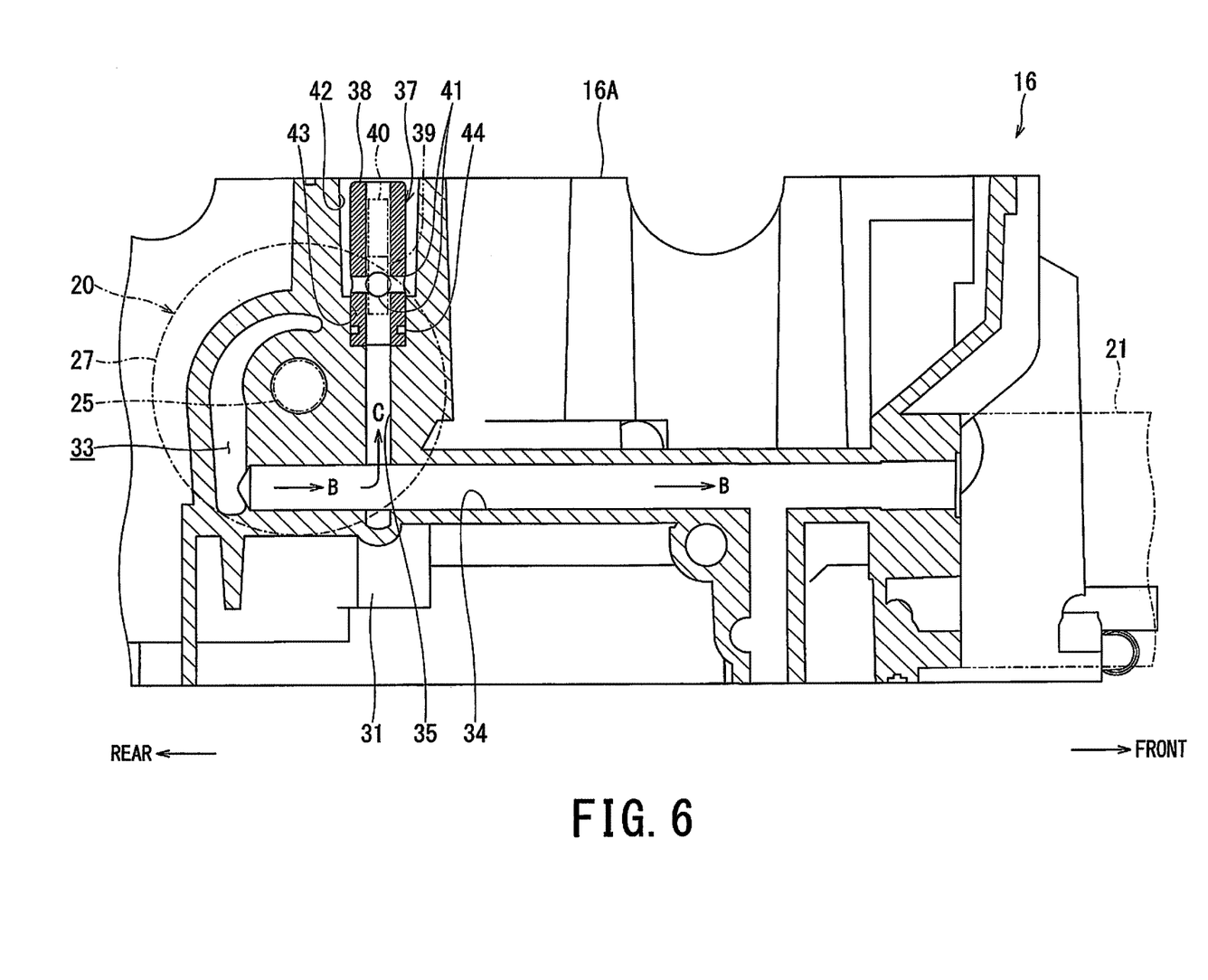
FIG. 6 is a sectional view taken along line VI-VI in FIG. 4.

The second suction passage 32 communicates with a first suction passage 31 formed in the lower crankcase 16 to extend in a vertical direction of the engine 10. The first suction passage 31 is provided to be connectable to the oil strainer 19 in the oil pan 18. As illustrated in FIGS. 5 and 6, the first discharge passage 33 communicates with a second discharge passage 34 formed in the lower crankcase 16 to extend in a horizontal direction of the engine 10. The second discharge passage 34 is provided to be connectable to the oil filter 21.

As illustrated in FIGS. 3, 5 and 6, the pump rotor 26 of the oil pump 20 rotates, whereby oil in the oil pan 18 sequentially flows in the first suction passage 31 and the second suction passage 32 through the oil strainer 19, and is sucked into the pump chamber 28 in the oil pump 20 to be pressurized. The pressurized oil is discharged to the first discharge passage 33 from the pump chamber 28, flows in the second discharge passage 34 and flows into the oil filter 21 to be filtered. The filtered oil is supplied to a required part of the engine 10 via an oil passage not illustrated, and lubricates the required part.

Figure 7:
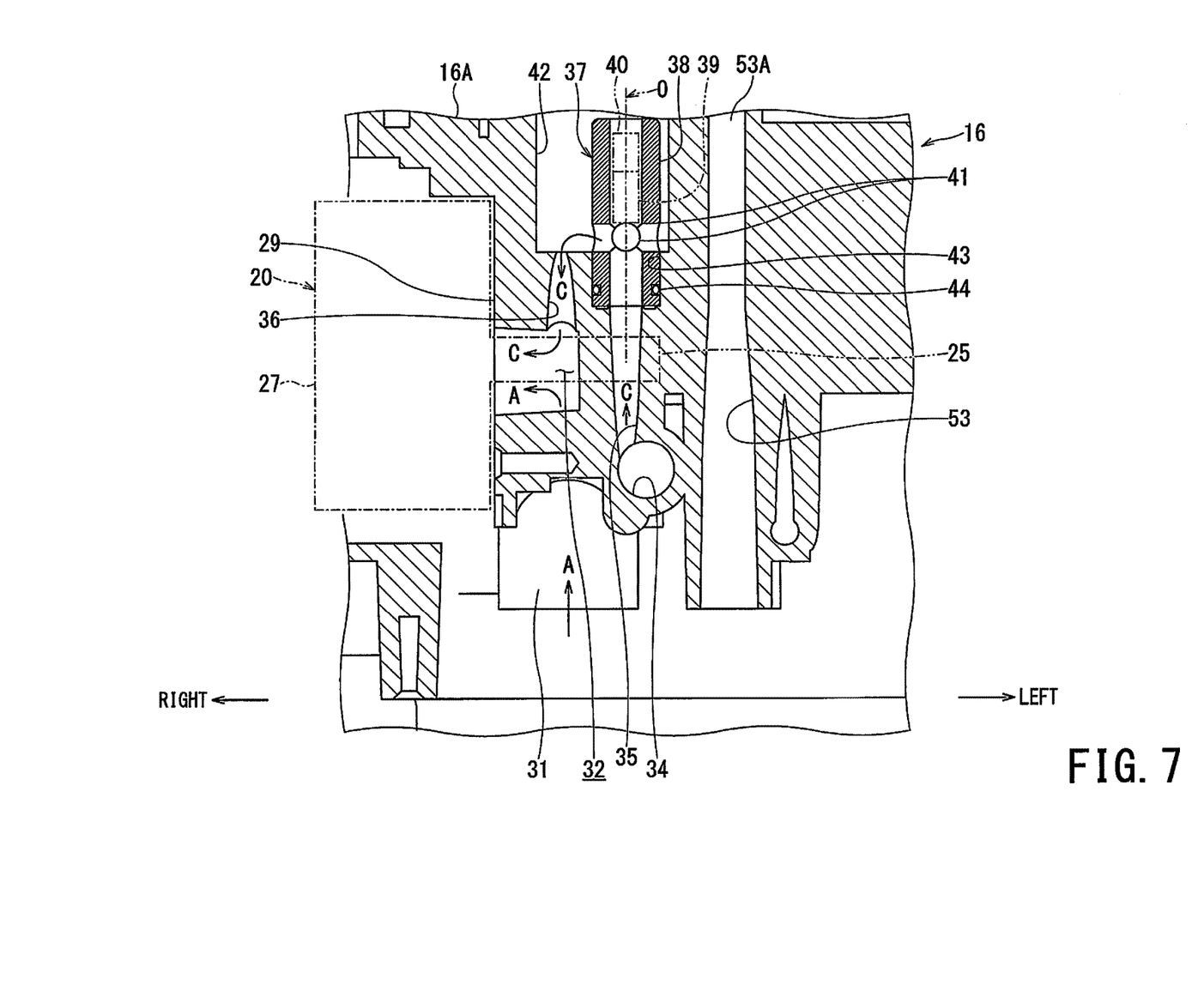
FIG. 7 is a sectional view taken along line VII-VII in FIG. 4.

As illustrated in FIGS. 6 and 7, a branch passage 35 and a surplus passage 36 that will be described in detail later are formed in the lower crankcase 16, the branch passage 35 communicates with the second discharge passage 34, the surplus passage 36 communicates with the second suction passage 32, and a relief valve 37 is placed between the branch passage 35 and the surplus passage 36. The relief valve 37 is configured by a valve body 39 being placed movably in an axial direction, in a cylindrical valve body 38, and the valve body 39 being given an urging force by a spring 40.

In the valve body 38, a plurality of outlets 41 are formed in the same position in a direction of an axis 0 thereof to be orthogonal to the axis 0. The valve body 39 is held in a position that closes the outlets 41 by an urging force of the spring 40, and brings the relief valve 37 into a closed state (a two-dot chain line in FIG. 6).

When pressure of oil in the second discharge passage 34 and the branch passage 35 reaches a predetermined value or more, the valve body 39 of the relief valve 37 moves against the urging force of the spring 40 in accordance with the pressure, and brings the outlets 41 into an open state, and the relief valve 37 performs a valve opening operation (a two-dot chain line in FIG. 7). The relief valve 37 performs a valve opening operation, whereby, as indicated by arrow C, part of oil (surplus oil) that flows in the second discharge passage 34 as arrow B passes through the branch passage 35, flows out from the outlets 41 of the relief valve 37 into a relief valve housing section 42 (described later), is further returned to the second suction passage 32 through the surplus passage 36, and is sucked into the pump chamber 28 of the oil pump 20, with the oil that flows into the second suction passage 32 as arrow A from the first suction passage 31.

A configuration in which the surplus oil in the second discharge passage 34 is returned to the first suction passage 31 through the relief valve 37 is referred to as an inner relief structure. The relief valve 37 is housed in the relief valve housing section 42 that is formed in the lower crankcase 16 and is larger in diameter than the relief valve 37, as illustrated in FIGS. 4, 6 and 7. More specifically, a valve insertion hole 43 having substantially the same diameter as the relief valve 37 is formed in a bottom surface of the relief valve housing section 42, and the valve body 38 of the relief valve 37 is inserted into the valve insertion hole 43 to be in a liquid tight state by a sealing section such as an O-ring 44.

As illustrated in FIG. 6, the branch passage 35 branches from the second discharge passage 34 in a position where the branch passage 35 overlaps the pump body 27 of the oil pump 20 in side view of the engine 10, extends in the vertical direction of the engine 10, and is formed to be coaxial with the valve insertion hole 43 of the relief valve housing section 42. The branch passage 35 allows the second discharge passage 34 and the valve insertion hole 43 of the relief valve housing section 42 to communicate with each other. However, after the valve body 38 of the relief valve 37 is inserted into the valve insertion hole 43 of the relief valve housing section 42 in the liquid tight state by the O-ring 44, the branch passage 35 and the second discharge passage 34 are in a state separated from the relief valve housing section 42 including the valve insertion hole 43, as long as the relief valve 37 is in the valve closed state.

Figure 8:
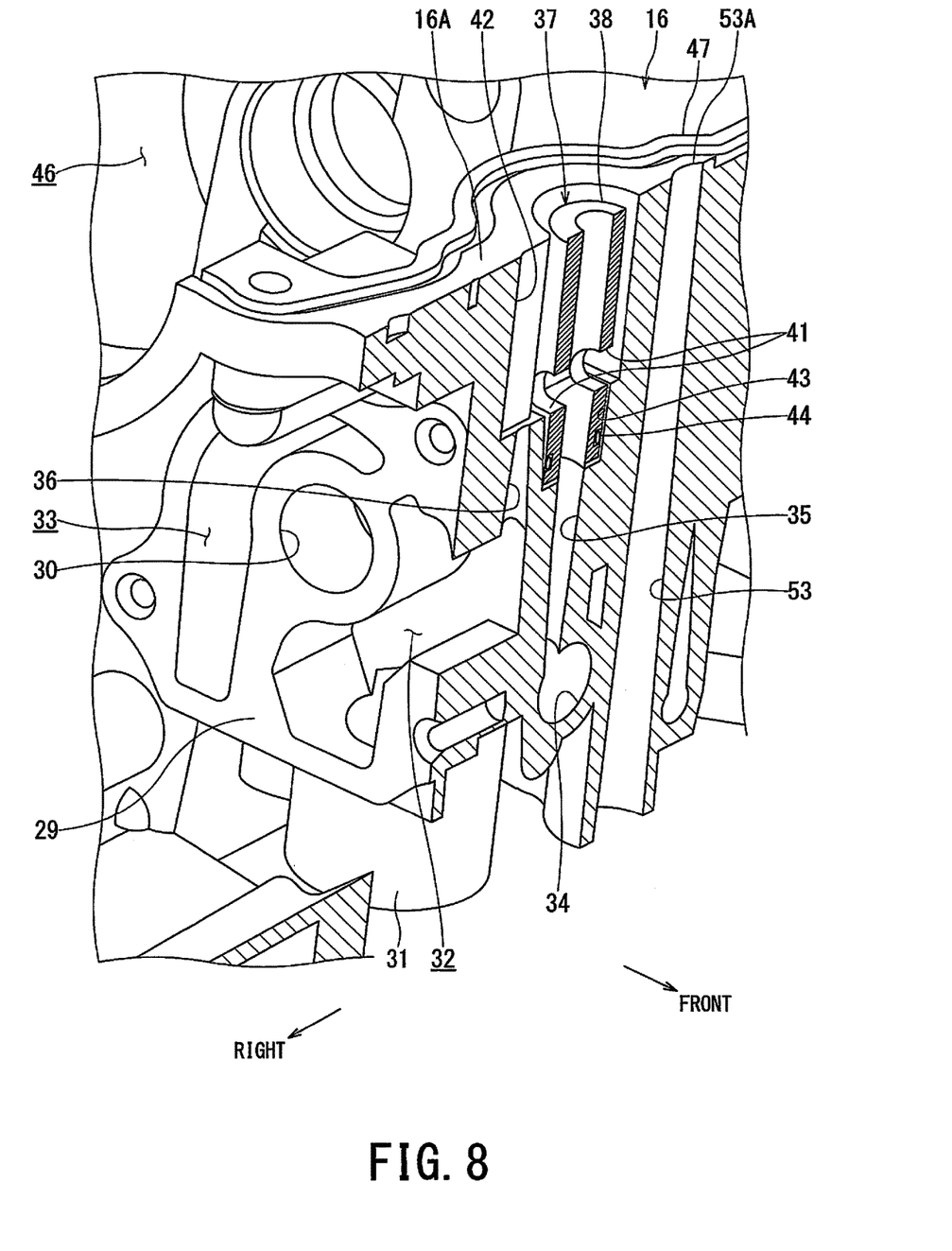
FIG. 8 is a perspective view illustrating a sectional shape part in FIG. 7 visually observed from a diagonally upper right front.

As illustrated in FIG. 7, the surplus passage 36 is adjacent to the branch passage 35, and is formed along the vertical direction of the engine 10 to be parallel with the branch passage 35. The surplus passage 36 has an upper end communicating with the relief valve housing section 42 and a lower end communicating with the second suction passage 32, and thereby allows the relief valve housing section 42 and the second suction passage 32 to communicate with each other. Further, as illustrated in FIGS. 4 and 8, the surplus passage 36 is provided to overlap the relief valve 37 in side view of the engine. In addition, the surplus passage 36 is provided in a position that is within a width W in a longitudinal direction of the engine 10 in the pump body 27 of the oil pump 20 in side view of the engine 10.

As illustrated in FIG. 6, in a state where the relief valve 37 is inserted into the valve insertion hole 43 of the relief valve housing section 42 and housed in the relief valve housing section 42, the relief valve 37 has a lower end portion of the valve body 38 positioned at substantially the same height as the pump shaft 25 of the oil pump 20 in the vertical direction of the engine 10. Thereby, an upper end portion of the valve body 38 is positioned at the same height as the mating surface 16A of the lower crankcase 16.

As illustrated in FIG. 6, in the state in which the relief valve 37 is inserted into the valve insertion hole 43 of the relief valve housing section 42 and housed in the relief valve housing section 42, the relief valve 37 has a part thereof (for example, a lower half part) disposed to overlap the pump body 27 of the oil pump 20 in side view of the engine 10. As illustrated in FIG. 7, the relief valve 37 is disposed in such a manner that an extension line of the axis O of the relief valve 37 intersects the pump shaft 25 of the oil pump 20, in front view of the engine 10. Accordingly, the relief valve 37 is disposed closely to the oil pump 20 in the longitudinal direction and a lateral direction of the engine 10, with the relief valve housing section 42 including the valve insertion hole 43, the branch passage 35 coaxial with the valve insertion hole 43, and the surplus passage 36 adjacent to the branch passage 35.

As illustrated in FIGS. 3 and 4, in the lower crankcase 16, a crank chamber 45 housing the crankshaft 23, and a mission chamber 46 housing the countershaft 24 and a speed reduction gear train not illustrated are provided, and the crank chamber 45 and the mission chamber 46 are separated by a partition wall 47.

As illustrated in FIGS. 4, 6 and 7, the relief valve housing section 42 directly communicates with the mating surface 16A of the partition wall 47 in the lower crankcase 16, and is provided in the lower crankcase 16 by casting out in the perpendicular direction to the mating surface 16A. The valve insertion hole 43, the branch passage 35 and the surplus passage 36 mentioned above indirectly communicate with the mating surface 16A of the partition wall 47 in the lower crankcase 16 via the relief valve housing section 42, and are provided by being machined in the lower crankcase 16 by a tool such as a drill, in the perpendicular direction to the mating surface 16A by using the relief valve housing section 42.

Figure 10:
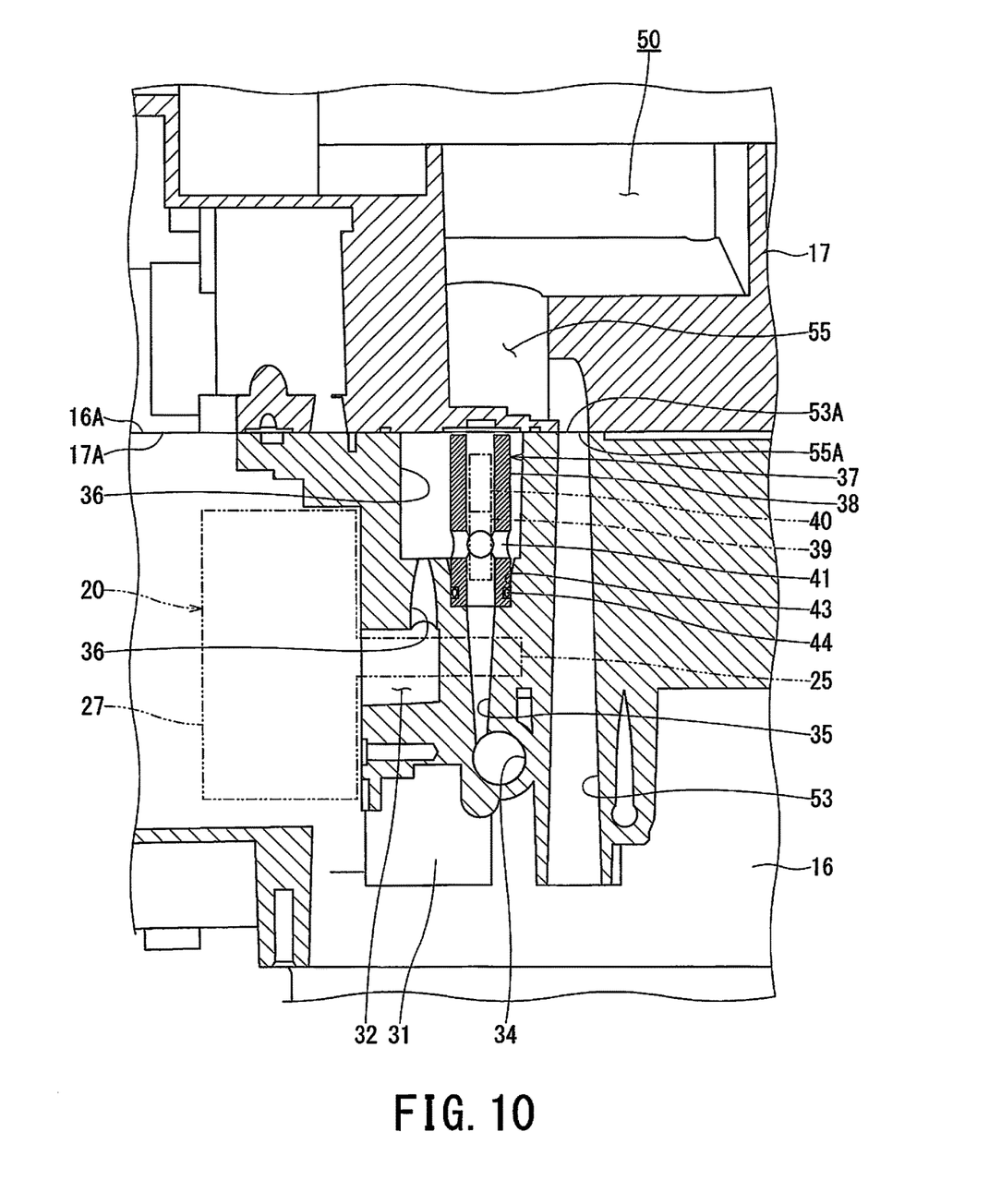
FIG. 10 is a sectional view taken along line X-X in FIG. 9.

As illustrated in FIGS. 2, 4 and 10, a breather chamber 50 is formed above the relief valve 37 disposed in the lower crankcase 16, in an upper part of the upper crankcase 17. The breather chamber 50 is covered with a breather chamber cover 51 from above. The breather chamber cover 51 is provided with a reed valve cover 52 that houses a reed valve (not illustrated). Oil that is separated from blowby gas in the breather chamber 50 passes through an oil return passage 53 provided in the lower crankcase 16, and is returned to the oil pan 18 (FIG. 3) through an oil returning component 54 illustrated in FIG. 11.

Figure 9:
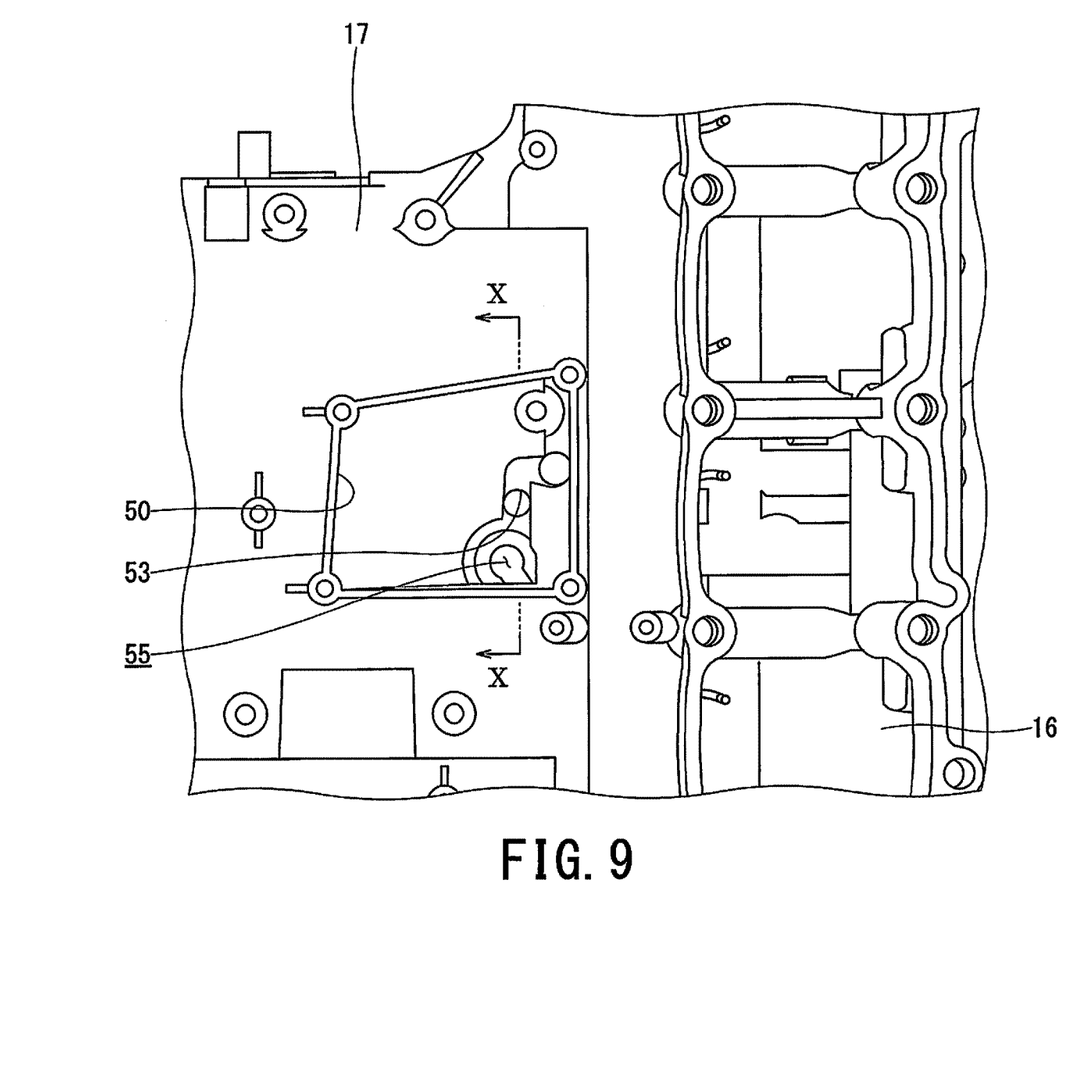
FIG. 9 is a partial plan view illustrating a part of an upper crankcase in FIG. 2.

As illustrated in FIGS. 9 and 10, the breather chamber 50 provided in the upper crankcase 17 includes a recessed portion 55 formed by a portion directly above the relief valve 37 installed in the lower crankcase 16 being lightened. In the breather chamber 50, a lowermost end 55A of the recessed portion 55 opens to the mating surface 17A of the upper crankcase 17. In the oil return passage 53 formed in the lower crankcase 16, an uppermost end 53A thereof opens to the mating surface 16A of the lower crankcase 16. Accordingly, the lowermost end 55A of the recessed portion 55 of the breather chamber 50 is at the same height in the vertical direction of the engine 10 as the uppermost end 53A of the oil return passage 53, and communicates with the uppermost end 53A of the oil return passage 53.

As illustrated in FIGS. 4 and 7, the oil return passage 53 directly communicates with the mating surface 16A of the partition wall 47 in the lower crankcase 16, and is provided in the lower crankcase 16 adjacently to and parallel with the relief valve housing section 42 and the valve insertion hole 43, in the perpendicular direction to the mating surface 16A. The oil return passage 53 is provided by casting out in the lower crankcase 16. The oil return passage 53, the relief valve housing section 42 (including the valve insertion hole 43 and the branch passage 35) and the surplus passage 36 are provided side by side in a straight line in a lateral width direction of the engine 10, in the partition wall 47 at an inner side of the oil pump 20.

Figure 11:
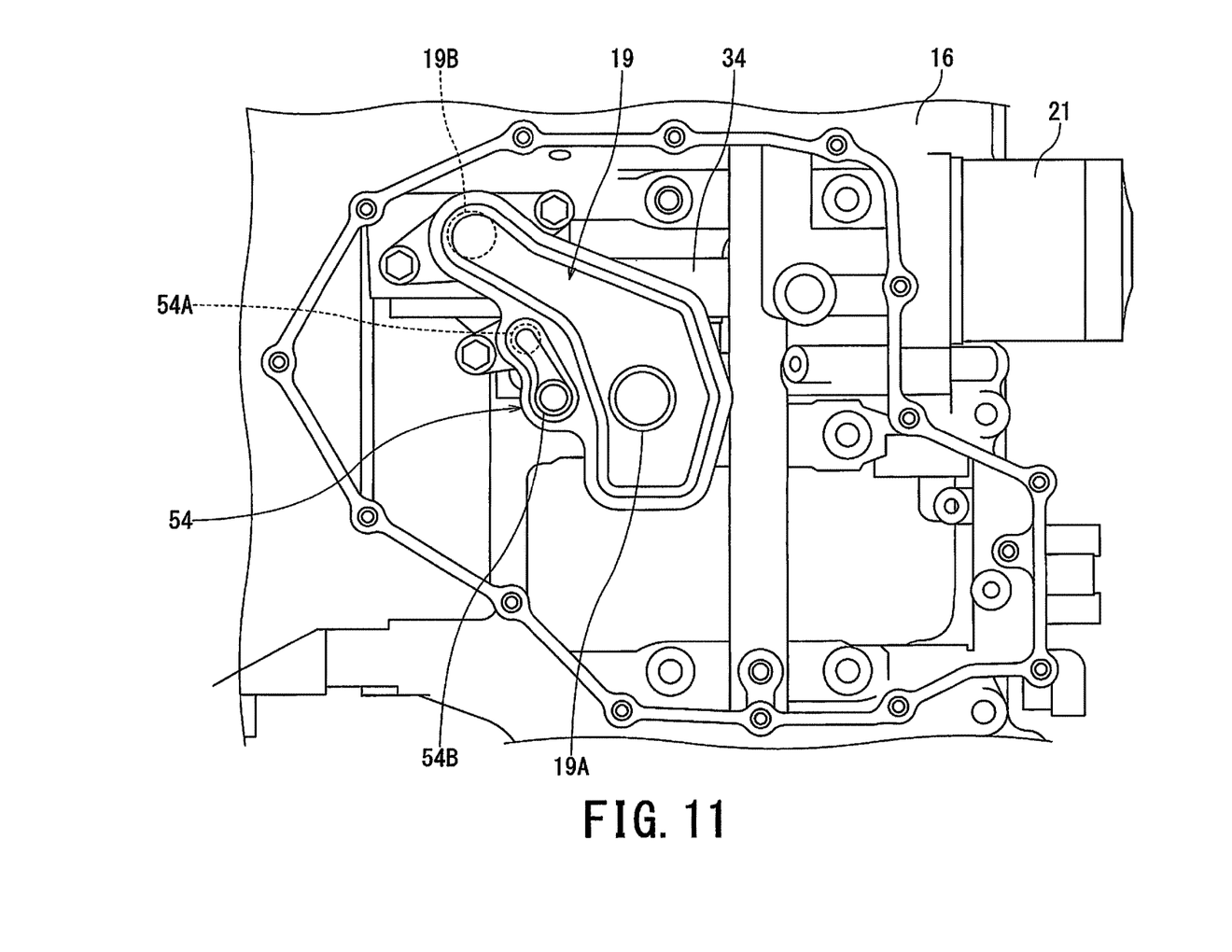
FIG. 11 is a partial bottom view illustrating a part of the lower crankcase in FIG. 3.

The oil returning component 54 illustrated in FIG. 11 is provided integrally with the oil strainer 19 placed in the oil pan 18. The oil strainer 19 is provided with an oil inlet portion 19A in which oil in the oil pan 18 flows, and is provided with an oil outlet portion 19B that is connected to the first suction passage 31 (FIG. 7) and guides oil in the oil strainer 19 to the first suction passage 31. In the oil returning component 54, a return oil inlet portion 54A that is connected to the oil return passage 53 and guides return oil into the oil returning component 54 is provided, and a return oil outlet portion 54B that causes the return oil in the oil returning component 54 to flow out into the oil pan 18 is provided in a vicinity of the oil inlet portion 19A of the oil strainer 19.

The lubrication structure for the engine 10 is configured by having the crankcase 11 including the lower crankcase 16 and the upper crankcase 17 mentioned above, the oil pan 18 that houses the oil strainer 19, the oil pump 20 installed in the lower crankcase 16, the oil filter 21 and the relief valve 37, the first suction passage 31, the second suction passage 32, the first discharge passage 33, the second discharge passage 34, the branch passage 35, the surplus passage 36, the relief valve housing section 42 and the oil return passage 53 which are formed in the lower crankcase 16, and the breather chamber 50 including the recessed portion 55 formed in the upper crankcase 17. Consequently, according to the present embodiment, the following effects (1) to (9) are exhibited.

(1) As illustrated in FIGS. 4 and 7, the relief valve housing section 42, the branch passage 35 and the surplus passage 36 directly or indirectly communicate with the mating surface 16A of the lower crankcase 16, and are provided by using the mating surface 16A. Consequently, the relief valve housing section 42, the branch passage 35 and the surplus passage 36 can be disposed closely in the vicinity of the oil pump 20. As a result, the surplus passage 36 is shortened and can be formed in a simple shape, so that the pump efficiency of the oil pump 20 can be enhanced.

(2) As illustrated in FIGS. 7 and 10, the relief valve housing section 42, the branch passage 35 and the surplus passage 36 which are provided to communicate with the mating surface 16A of the lower crankcase 16 directly or indirectly are closed with the upper crankcase 17 as a lid. Consequently, blank caps are not required by the relief valve housing section 42, the branch passage 35 and the surplus passage 36 around the relief valve 37. As a result, the number of components can be reduced, and the weight and the number of assembly steps of the crankcase 11 can be reduced.

(3) As illustrated in FIGS. 4 and 7, the relief valve housing section 42, the valve insertion hole 43, the branch passage 35, the surplus passage 36 and the oil return passage 53 are provided in the perpendicular direction to the mating surface 16A of the lower crankcase 16. Consequently, the relief valve housing section 42 and the oil return passage 53 can be formed in a casted-out shape at the time of molding the lower crankcase 16, so that machining of the relief valve housing section 42 and the oil return passage 53 can be reduced. Further, the valve insertion hole 43, the branch passage 35 and the surplus passage 36 can be machined by inserting the tool such as a drill by using the relief valve housing section 42, so that machining of the valve insertion hole 43, the branch passage 35 and the surplus passage 36 can be facilitated.

(4) As illustrated in FIGS. 4 and 6, the relief valve 37 is disposed to partially overlap the pump body 27 of the oil pump 20 in side view of the engine 10. Consequently, a length in the longitudinal direction of the lower crankcase 16 can be restrained, so that a length of the surplus passage 36 that allows the relief valve housing section 42 and the second suction passage 32 (FIG. 7) to communicate with each other can be shortened. Accordingly, from this point of view, the pump efficiency of the oil pump 20 can be also enhanced.

(5) As illustrated in FIGS. 4 and 8, the surplus passage 36 overlaps the relief valve 37 in side view of the engine 10, and is provided within the width W in the longitudinal direction of the engine 10 in the oil pump 20. Consequently, a part of the relief valve housing section 42 that houses the relief valve 37 functions as a part of a surplus passage that guides oil that flows out from the outlet 41 of the relief valve 37 to the surplus passage 36. As a result, the surplus passage 36 can be formed in a simple straight line shape without providing curved spots in the surplus passage 36, so that the surplus passage 36 can be shortened from this point of view, and the pump efficiency of the oil pump 20 can be enhanced.

(6) As illustrated in FIG. 6, the relief valve 37 has a lower end portion thereof positioned at substantially the same height as the pump shaft 25 of the oil pup 20 in the vertical direction of the engine 10. Consequently, the height (dimension in the vertical direction) of the lower crankcase 16 can be restrained, the branch passage 35 and the surplus passage 36 (FIG. 8) are further shortened, and machining amounts of the branch passage 35 and the surplus passage 36 can be decreased.

(7) As illustrated in FIGS. 9 and 10, the oil return passage 53 that returns oil from the breather chamber 50 formed in the upper crankcase 17 to the oil pan 18 (FIG. 3) is formed in the lower crankcase 16 adjacently to and parallel with the relief valve housing section 42. Consequently, as illustrated in FIGS. 4 and 8, the lower crankcase 16 can be constructed to be compact in the lateral direction of the engine 10. As a result, as illustrated in FIGS. 10 and 11, the oil returning component 54 for returning oil into the oil pan 18 by being connected to a downstream end of the oil return passage 53 can be integrated with the oil strainer 19 that is connected to the first suction passage 31 located directly under the relief valve housing section 42. As a result, the number of components and the number of assembly steps can be reduced.

(8) As illustrated in FIGS. 9 and 10, the breather chamber 50 formed in the upper crankcase 17 includes the recessed portion 55 having the lowermost end 55A that is positioned at the same height as the uppermost end 53A of the oil return passage 53 in the vertical direction of the engine 10. The recessed portion 55 is obtained by lightening the upper crankcase 17 in the portion above the relief valve 37, so that reduction in the weight and casting performance of the upper crankcase 17 can be realized.

Further, the breather chamber 50 includes the recessed portion 55, and thereby a capacity of the breather chamber 50 can be enlarged. Further, the breather chamber 50 is covered with the breather chamber cover 51, and thereby water, dust and the like can be prevented from accumulating in the recessed portion 55.

(9) As illustrated in FIGS. 4 and 7, in the partition wall 47 that separates the crank chamber 45 and the mission chamber 46 in the lower crankcase 16, the relief valve housing section 42 including the valve insertion hole 43 and the branch passage 35, the surplus passage 36 and the oil return passage 53 are provided in the straight line in the lateral width direction of the engine 10. By forming the partition wall 47 to be of a thick structure to a thickness in which the relief valve housing section 42 including the valve insertion hole 43 and the branch passage 35, the surplus passage 36 and the oil return passage 53 can be formed, whereby the strength of the partition wall 47 can be enhanced while increase in the weight of the lower crankcase 16 is minimized.

While the embodiment of the present invention is described thus far, the embodiment is only presented as an example, and does not intend to limit the claims. The embodiment can be carried out in the other various modes, and various omissions, replacements and changes can be made within the range without departing from the gist of the invention, and the replacements and changes are included in the claims and gist, and are included in the range of the invention described in the clams and equivalents thereof.

For example, in the aforementioned embodiment, the engine which is loaded on a motorcycle is described as the engine 10 which is an internal combustion engine, but the engine may be an engines loaded on a four-wheel automobile, an outboard motor, or a water vehicle, or a general-purpose engine.

The invention claimed is:

1. A lubrication structure for an internal combustion engine, comprising:
a crankcase configured by connecting an upper crankcase on a mating surface of a lower crankcase from above, having an oil pan that stores oil and is disposed in a lower part of the lower crankcase, and configuring a main part of the internal combustion engine;
an oil pump that is installed in the lower crankcase, sucks oil in the oil pan through a suction passage formed in the lower crankcase, and discharges the oil into a discharge passage formed in the lower crankcase to pressure-feed the oil; and
a relief valve that is installed in the lower crankcase, and performs a valve opening operation in accordance with pressure of oil in the discharge passage to return surplus oil in the discharge passage to the suction passage through a surplus passage formed in the lower crankcase, wherein a relief valve housing section that houses the relief valve, and the surplus passage that allows the relief valve housing section and the suction passage to communicate with each other are provided to communicate with the mating surface of the lower crankcase directly or indirectly.

2. The lubrication structure for an internal combustion engine according to claim 1,
wherein the relief valve housing section and the surplus passage are provided in a direction perpendicular to the mating surface of the lower crankcase.

3. The lubrication structure for an internal combustion engine according to claim 1,
wherein the relief valve is disposed to partially overlap the oil pump in side view of the internal combustion engine.

4. The lubrication structure for an internal combustion engine according to claim 1,
wherein the surplus passage overlaps the relief valve in side view of the internal combustion engine, and is provided in a width within an internal combustion engine longitudinal direction in the oil pump.

5. The lubrication structure for an internal combustion engine according to claim 1,
wherein the relief valve has a lower end portion positioned at substantially a same height as a pump shaft of the oil pump in a vertical direction of the internal combustion engine.

6. The lubrication structure for an internal combustion engine according to claim 1,
wherein in the upper crankcase, a breather chamber is formed above the relief valve, and an oil return passage that returns oil from the breather chamber to the oil pan is formed in the lower crankcase adjacently to and parallel with the relief valve housing section.

7. The lubrication structure for an internal combustion engine according to claim 6,
wherein a lowermost end of the breather chamber is positioned at a same position as an uppermost end of the oil return passage in the vertical direction of the internal combustion engine.

8. The lubrication structure for an internal combustion engine according to claim 6,
wherein the relief valve housing section, the surplus passage and the oil return passage are provided, side by side in a straight line in a lateral width direction of the internal combustion engine, in a partition wall that separates a crank chamber and a mission chamber in the lower crankcase.

* * * * *